United States Patent
Hahn et al.

(10) Patent No.: US 8,220,034 B2
(45) Date of Patent: Jul. 10, 2012

(54) USER AUTHENTICATION BASED ON AUTHENTICATION CREDENTIALS AND LOCATION INFORMATION

(75) Inventors: Timothy J. Hahn, Cary, NC (US); Heather Hinton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 11/957,974

(22) Filed: Dec. 17, 2007

(65) Prior Publication Data

US 2009/0158404 A1    Jun. 18, 2009

(51) Int. Cl.
*G06F 7/04* (2006.01)
(52) U.S. Cl. ............................................. 726/5; 726/2
(58) Field of Classification Search .................... 726/2, 5
See application file for complete search history.

(56) References Cited

U.S. PATENT DOCUMENTS

| | | | | |
|---|---|---|---|---|
| 5,757,916 | A * | 5/1998 | MacDoran et al. | 380/258 |
| 6,978,023 | B2 * | 12/2005 | Dacosta | 380/258 |
| 7,418,267 | B2 * | 8/2008 | Karaoguz | 455/456.1 |
| 2003/0159066 | A1 * | 8/2003 | Staw et al. | 713/201 |
| 2003/0169881 | A1 * | 9/2003 | Niedermeyer | 380/258 |
| 2004/0254868 | A1 * | 12/2004 | Kirkland et al. | 705/35 |
| 2008/0222038 | A1 * | 9/2008 | Eden et al. | 705/44 |
| 2008/0287142 | A1 * | 11/2008 | Keighran | 455/456.5 |
| 2009/0049538 | A1 * | 2/2009 | Ui et al. | 726/12 |

* cited by examiner

*Primary Examiner* — Kambiz Zand
*Assistant Examiner* — Amare F Tabor
(74) *Attorney, Agent, or Firm* — Thomas E. Lees, LLC

(57) ABSTRACT

A computer program product, apparatus, and system, are disclosed for user authentication based on authentication credentials and location information. A computer program product performs operations for such authentication. These operations of the computer program product include referencing past user location information in response to an authentication validation request and referencing current user location information. These operations also include determining a maximum allowable distance between an authentication attempt location associated with the authentication attempt location identifier and a past location associated with the past user interaction location identifier, and managing the authentication attempt, in response to determining that the physical authentication attempt location is outside the maximum allowable distance. The computer program product, apparatus, and system thereby reduce the possibility of identity theft by adding an element of location awareness to the authentication process.

25 Claims, 6 Drawing Sheets

USER AUTHENTICATION BASED ON AUTHENTICATION CREDENTIALS AND LOCATION INFORMATION

BACKGROUND OF THE INVENTION

1. Field of the Invention

This invention relates to user authentication and more particularly relates to authenticating a user based on authentication credentials and location information.

2. Description of the Related Art

An individual interacts with many computer systems for various purposes on a daily basis. Such purposes may relate to employment, finances, entertainment, and communication to name a few. Due to the sensitive and personal nature of much of this information, many computer systems typically perform some method of authentication, or verification of the identity of the person attempting to access the system.

Typically, an authentication system will receive as input a user's "credentials." These credentials may consist of a username and password, Personal Identification Number (PIN) number, social security number, and a bank account or debit card number. For a username and password system, the system will first verify that the username is represented in a database or other storage device and second, that the received password matches the password associated with the stored username.

Additionally, many financial transactions involving debit or bank cards require the user to not only swipe the card, but also enter a PIN number into a terminal at a grocery store or ATM. The rise in use of portable devices such as cell-phones and PDAs has increased the need for authentication as a cellular provider verifies a user's identity before allowing access to voicemail, instant messaging, or web-browsing from a portable device.

Another typical role of authentication is security systems. Many facilities are protected by electronic key systems which identify an entrant by a chip or a card. For example, an employee at an electronics manufacturer may use his key card to gain access to his office building, or a secured room inside the building.

Common systems use an authentication server which may perform the authentication for one or more computer systems. For example, one authentication server may perform the authentication for several e-commerce websites hosted in different locations. However, authentication may also be performed at a local level. For example, a user may need to enter a username and password to have access to the files and operating system of his personal computer.

Regardless of whether the authentication is performed at the local level or system level, the quality of an authentication system is its ability to ensure that the person attempting access to an account is the account's owner or rightful user.

BRIEF SUMMARY OF THE INVENTION

A computer program product is presented for authenticating a user based on authentication credentials and location information. The operations of the computer program product may comprise referencing past user location information in response to an authentication attempt, referencing current user location information, and determining a maximum allowable distance between a physical authentication attempt location associated with the authentication attempt location identifier and a past physical location associated with the past user interaction location identifier. Additionally, the computer program product may manage the authentication attempt, in response to determining that the physical authentication attempt location is outside the maximum allowable distance from the past physical location.

In one embodiment, the computer program product manages the authentication attempt by denying the authentication attempt. Furthermore, managing the authentication attempt may also comprise prompting the user for additional information to validate the authentication attempt. In this embodiment, the computer program product may further comprise resetting past user location information to current location in response to a positive validation, the positive validation performed with additional information provided by the user. In another embodiment, managing the authentication attempt may also comprise an action selected from a user-configurable set of actions.

The computer program product, in one embodiment, is configured to determine that the physical authentication attempt location is within the maximum allowable distance from the past physical location and allow the authentication attempt of the user. In a further embodiment, the computer program product may be configured such that determining the maximum allowable distance further comprises multiplying a maximum velocity by the difference between the past user interaction timestamp and the authentication attempt timestamp. Additionally, the computer program product may further comprise determining that the distance between a current physical user location associated with user location information obtained from a personal device is outside the maximum allowable distance from the physical authentication attempt location obtained from an authentication attempt and denying the authentication attempt.

In addition, an apparatus for authenticating a user based on authentication credentials and location information is also provided with a plurality of modules configured to functionally perform the necessary steps as described above in relation to the computer program product. These modules in the described embodiments include a communication module, a determination module, and a validation module.

The validation module, in one embodiment, is further configured to alert the user in response to a denied authentication attempt. The apparatus may also comprise a tracking module configured to store user location information in a repository at designated intervals.

A system of the present invention is also presented for authenticating a user based on authentication credentials and location information. The system may be embodied as a network configured to communicate data between a plurality of devices, a client in communication with the network, the client configured to provide authentication credentials and current user location information, and a server in communication with the network.

In certain embodiments, the server is further configured to alert the user in response to a denied authentication attempt. The server may further be configured to signal the client to automatically logout a logged-in user for the same account as a current user in response to a positive authentication with the current user, the positive authentication comprising an authentication based on authentication credential information for the current user. In addition, the system may further comprise a database in communication with the network and configured to store user location information in a repository in response to a user interaction.

In addition, a computer program product is also presented for a third-party validation service based on user location information. The computer program product may consist of tracking user location information based on a user interaction, receiving a location validation request with current user location information, and referencing past user location information. Furthermore, the computer program product may determine a maximum allowable distance between a physical authentication attempt location associated with the current location identifier and a past physical location associated with the authentication attempt location identifier. Also, the computer program product may deny the location validation request, in response to determining that the current physical user location is outside the maximum allowable distance and allow the location validation request, in response to determining that the physical authentication attempt location is within the maximum allowable distance from the past physical location.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
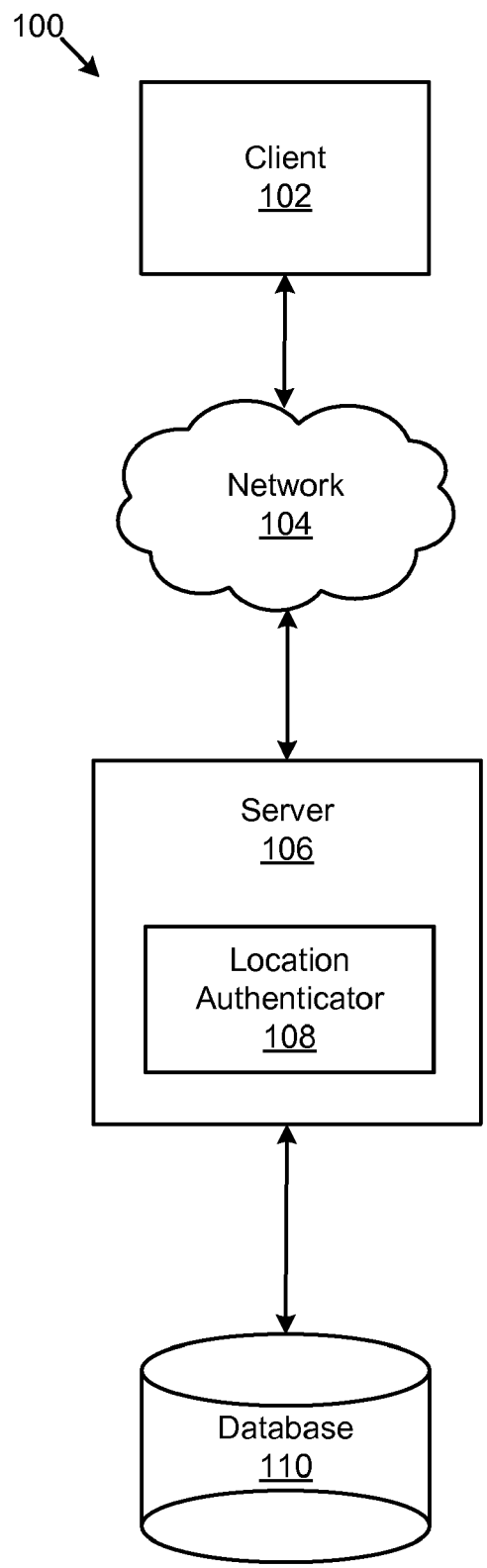
FIG. 1 is a schematic block diagram illustrating one embodiment of a system for user authentication based on authentication credentials and location information.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for user authentication based on authentication credentials and location information. The system 100 includes a client 102, a network 104, a server 106 with a location authenticator 108, and a database 110. In one embodiment, the client 102 is a desktop computer. Alternatively, the client 102 may comprise, but is not limited to, a cell-phone, a handheld computing device, a portable computer, a server, a mainframe, an Automated Teller Machine (ATM), and the like. In a further embodiment the client 102 may include key card entry terminals, debit or credit card terminals, a Point of Sale (POS) device or other electronic device with an embedded computing system. The client 102 and the server 106 may be configured to communicate over a network 104. The network 104 may comprise a common Local Area Network (LAN), Wide Area Network (WAN), Wireless Local Area Network (WLAN), a cellular communications network, or other communications network. The network 104 may also comprise a global communications network such as the Internet.

The server 106 includes a location authenticator 108 for user authentication based on authentication credentials and location information. The location authenticator 108 will be discussed in greater detail below.

The database 110 stores user location information which may consist of a past user interaction timestamp and a past user interaction location identifier. As used herein, the term "user interaction" may include, but not be limited to an authentication (successful or unsuccessful), a log-off action, an ATM withdrawal, a credit card transaction, a keycard entry, a biometric or smart card reading, a Global Positioning Device reading, a cell-phone call, a type or duration of user input at a keyboard, or the like. A user interaction may further include any user communication with a computer system in which the user's identity is traceable. The location authenticator 108 references the user location information from the database 110 as described in greater detail below.

Figure 2:
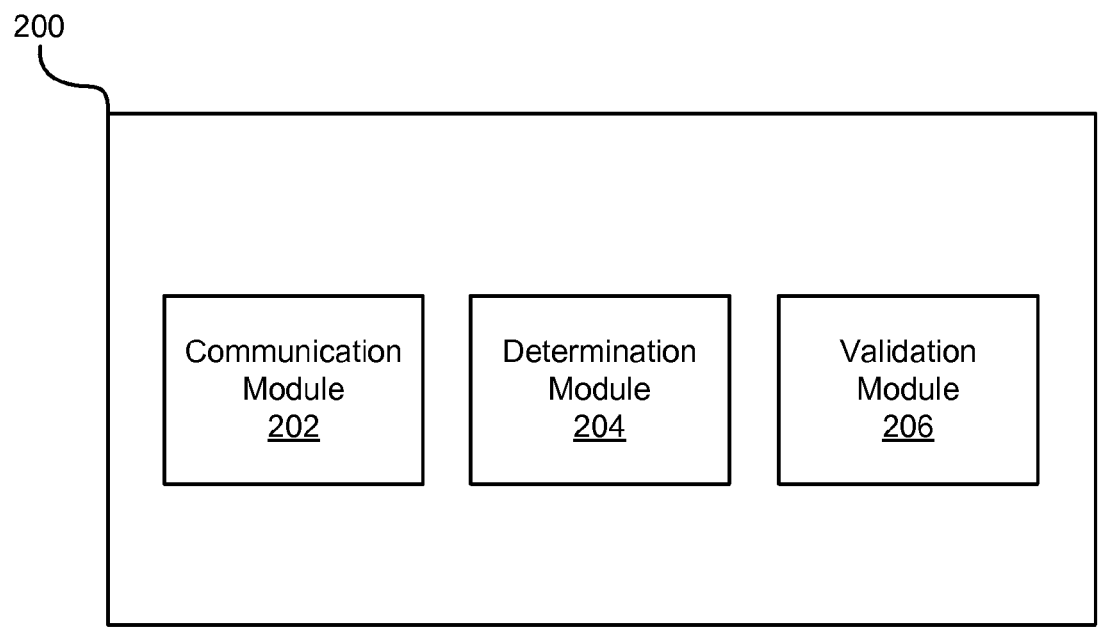
FIG. 2 is a schematic block diagram illustrating one embodiment of an apparatus for user authentication based on authentication credentials and location information.

FIG. 2 illustrates one embodiment of an apparatus 200 for user authentication based on authentication credentials and location information. The apparatus 200 depicts one embodiment of the location authenticator 108 and includes a communication module 202, a determination module 204, and a validation module 206.

In one embodiment, the communication module 202 is configured to reference past user location information and reference current user location information. Current user location information may comprise an authentication attempt timestamp and an authentication attempt location identifier. The referencing may be performed when the location authenticator 108 receives an authentication request from a client 102.

In one embodiment, the communication module 202 references past user location information from the database 110. For example, the communication module 202 may retrieve a record that includes the past user location information from a table. The past user location information is preferably the most recent past user location information. The past user location information is the past physical location of the user that is attempting to authenticate.

In addition, the communication module 202 references current location information. The current user location information is the current physical location of the user. The current location information may come directly from the client 102. An example of direct current location information is the coordinates from a Global Positioning Satellite (GPS) device. Alternatively, the current location information may be derived from information the communication module 202 has about the client 102. The location information obtained from the IP address of a client computer that is associated with a fixed location is an example of derived current location information.

The authentication attempt location identifier, either past or current, serves to uniquely identify the physical location geographically on the earth. The authentication attempt location identifier may be obtained but is not limited to the source IP address of a desktop personal computer, the nearest cellular signal tower to the user's cell-phone, a DNS/DHCP server name, a wireless network location, the location in a building of an Ethernet port, the GPS coordinates of the client 102, the street address of the physical facility housing the client 102, the latitude and longitude of the client 102, the results of an RFID reader for an RFID device associated with the client 102, and that reader's physical location, and the like.

In one embodiment, the determination module 204 is configured to determine a maximum allowable distance between a physical authentication attempt location associated with the authentication attempt location identifier and a past physical location associated with the past user interaction location identifier. Because a user cannot be in two places at once, the determination that a user is within the maximum allowable distance further establishes that the individual attempting authentication under the user's account is actually the user. Additionally, the maximum allowable distance reflects a "best case" scenario and any distance less than the maximum allowable further increases the chance that the individual attempting authentication is the intended and authorized user.

The validation module 206 may have several settings corresponding to configurable potential actions which determine how to manage negative location validations when the determination module 204 determines that the physical authentication attempt location is outside the maximum allowable distance. In one embodiment, the validation module 206 is configured to deny the authentication attempt. The validation module 206 may also be set to prompt the user for additional information to validate the user's identity if the physical authentication attempt location is outside the maximum allowable distance. For example, the validation module 206 may prompt a user with a security question as the user attempts to access his email account. Furthermore, once additional identification has been provided to validate a user and establish a known "good" location, the past user location information may be reset to the current known location.

Other actions the validation module 206 may take include alerting law enforcement authorities, alerting a user, logging out one or more users currently authenticated in one or more of the user's accounts, freezing the financial or credit accounts of a user, receiving or obtaining user-location information from a personal device such as a cell-phone or GPS unit, or any other user-configured action. In addition, the user may override the location authentication process and set the validation module 206 to allow the authentication attempt despite any negative location validation. This action may also be set to override the location authentication process for a specific amount of time. One of ordinary skill in the art would appreciate that many more actions may be taken to protect the security and identity of a user.

In addition, the validation module 206 may also be configured to permit the authentication attempt of the user, in response to the determination module 204 determining that the physical authentication attempt location is within the maximum allowable distance from the past physical location. For example, if the maximum allowable distance is 20 miles and the physical authentication attempt location of the user is 30 miles away from the physical location indicated from the past user location identifier, the validation module 206 will deny the authentication attempt.

In one embodiment, the validation module 206 is configured to store the denied authentication attempt in a log that may be accessed by law enforcement, investigators, or other authorized personnel. The validation module 206 may also be configured to alert the user by email, text message, or other means of the failed authentication attempt. In this manner, the user may be notified of possible identify theft and may take protective measures. If another individual is logged in to a client 102 when the validation module 206 makes a positive authentication, the validation module 206 may signal the client 102 to automatically log the other individual off for the same account as a current user because that individual is likely an imposter. Furthermore, the validation module 206 may be set to log off all instances of user authentication if a valid user cannot be determined. However, if the identity of the user may be determined in one of the authentication attempts, such as a clerk viewing a photo identification of a customer in a grocery store, the other authenticated instances may be logged off and the user's location may be set to the known "good" value at the grocery store.

Figure 3:
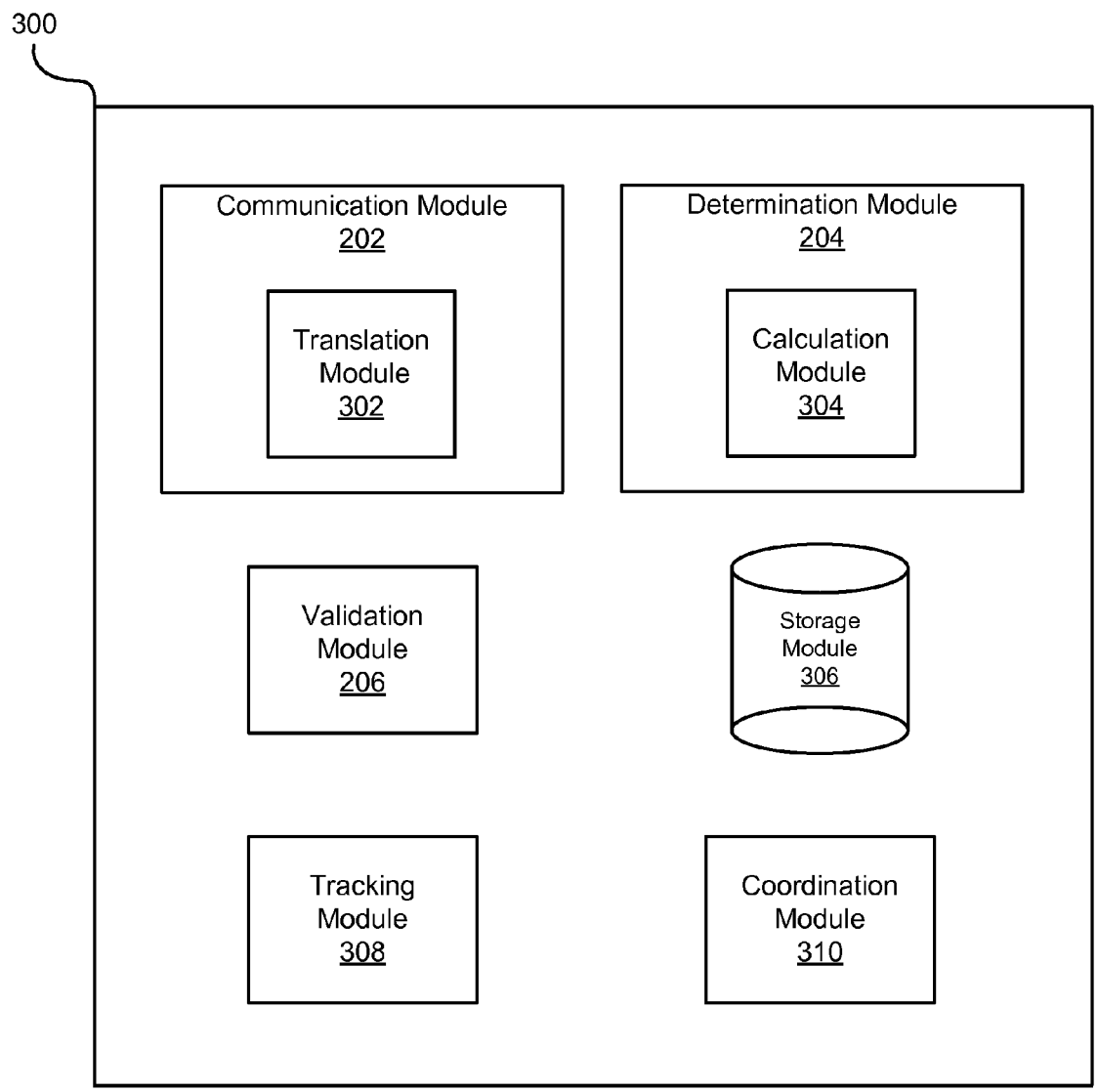
FIG. 3 is a detailed schematic block diagram illustrating one embodiment of an apparatus for user authentication based on authentication credentials and location information.

FIG. 3 illustrates another embodiment of an apparatus 300 for user authentication based on authentication credentials and location information. The apparatus 300 includes the communication module 202, determination module 204, and validation module 206, wherein these modules include substantially the same features as described above with relation to FIG. 2.

Additionally, the communication module 202 may contain a translation module 302 to convert one or both location identifiers to a common format such as latitude and longitude coordinates for ease of comparison. For example, the past location identifier was obtained from a cellular signal tower having an associated set of latitude and longitude coordinates while the current location identifier is obtained from a wireless network location having only an associated zip code. The translation module 302 converts the location identifiers to latitude and longitude coordinates if needed for comparison by the determination module 204.

The translation module 302 may also be configured to convert user location information to a location specific format such as the floors of an office building. For example, in an information sensitive high security laboratory, the past user location identifier is obtained from an Ethernet port in the wall in the north end of floor three and the current user location identifier is obtained from a wireless network in the north end of floor two. Although the location information would be at the same latitude and longitude coordinates, the translator may be configured to convert the location information to a building specific format consisting of floor and area information as needed.

Additionally, the determination module 204 may contain a calculation module 304 configured to multiply a maximum velocity by the difference between the past user interaction timestamp and the authentication attempt timestamp to determine the maximum allowable distance. The maximum velocity by default may be the fastest mode of travel. For example, if the difference between the past and current user interaction timestamps is twenty minutes, the maximum velocity may be the speed of travel by vehicle.

However, in one embodiment, the calculation module 304 is further configured to use the velocity of a particular mode of transportation as a maximum velocity. The mode of transportation utilized by the calculation module 304 may depend on the difference between the past user interaction timestamp and the authentication attempt timestamp. For example, if the difference is two days, the speed of an airplane may be used as the maximum velocity. However, if the difference is two hours, the speed of an automobile may be used as the maximum velocity. The maximum velocity may also be predefined, may include a combination of various modes of travel, or may include other variables such as the time of day. The maximum velocity may also be configured to depend on the distance between physical user locations. For example, if the past physical user location is in a different state than the current physical user location, the maximum velocity may be selected as the speed of air travel.

Additionally, the calculation module 304 may be further configured to use velocity along an optimal travel route as the maximum velocity. Therefore, as transportation rarely involves travel in a straight line, airline flight paths, highways, and railroad lines may be considered by the calculation module 304 in determining maximum velocity. Third party programs such as Mapquest or Google Maps may be used in determining routes and distances.

In certain embodiments, the apparatus 300 further comprises a storage module 306 configured to store user location information in a repository in response to a user interaction. For example, a user makes a cell-phone call, the communication module 202 receives the user location information and timestamp, and the communication module 202 stores in the storage module 306 the user's location in the form of a user location identifier and a timestamp. The database 110 may act as the repository to store user location information.

In one embodiment, the apparatus further comprises a tracking module 308 configured to store user location information in a repository at designated intervals. The tracking module 308 may track location information without a user interaction. User location information may be obtained at the designated interval with a device that is kept on or near a user's person such as a cell-phone or GPS unit. The communication module may also be enabled to obtain data by either a "push" or a "pull" model, meaning that the communication module may actively obtain user location information or passively receive such information when transmitted. The tracking module 308 may obtain user location information from the communication module 202 receiving the information directly from the device at the designated interval. Additionally, the communication module 202 may also query or probe the client 102 device at the interval. Short intervals may be designated for an employee in a high security working environment.

The apparatus 300 may also comprise a coordination module 310 configured to determine that the distance between a current physical user location obtained from a personal device is outside the maximum allowable distance from the physical authentication attempt location information obtained from an authentication attempt. Consequently, the coordination module 310 may signal the validation module 206 to deny an authentication attempt.

In this manner, the coordination module 310 verifies current user location information with another device which is often carried on a user's person to ensure the user's identity. This device may include but is not limited to a cell-phone or GPS unit and may provide its location when queried or transmit its location to the communication module 202.

For example, the communication module 202 may receive user location information from an authentication request at an ATM in Los Angeles. However, the coordination module 310 also determines that the current user location information obtained from the user's cell-phone 102 indicates that the physical location of the user is actually in New York. Consequently, the coordination module 310 signals the validation module 206 to deny the authentication attempt. The reason for the denied attempt is that the a personal electronic item client such as a cell-phone 102 owned by a user would likely be found on a user's person, or in very close physical proximity to the user.

This embodiment is useful for situations in which an unauthorized user may steal a credit or ATM card and make an initial purchase at a new location, thereby setting the user location information at the new location. In order to prevent repeated purchases near the location of the illicit transaction, a personal device may be queried which indicates that the authorized user is away from the area of the transaction. Furthermore, the coordination module may be configured with user-specific settings in determining how to proceed. These settings may include disabling the coordination module, denying the authentication attempt, setting an alert for a cashier to ask for identification or for an ATM to ask for a zip code or phone number, or alerting law enforcement authorities to track a cell-phone in case the phone was stolen along with a credit card.

For example, the coordination module may be set to deny the credit card transaction if the personal device is away from the attempted authentication site. Conversely, the module may be set to alert the sales clerk to request additional identification to verify the user's identity. This may be useful if the user left her cell-phone 102 or other personal device at home.

Figure 4:
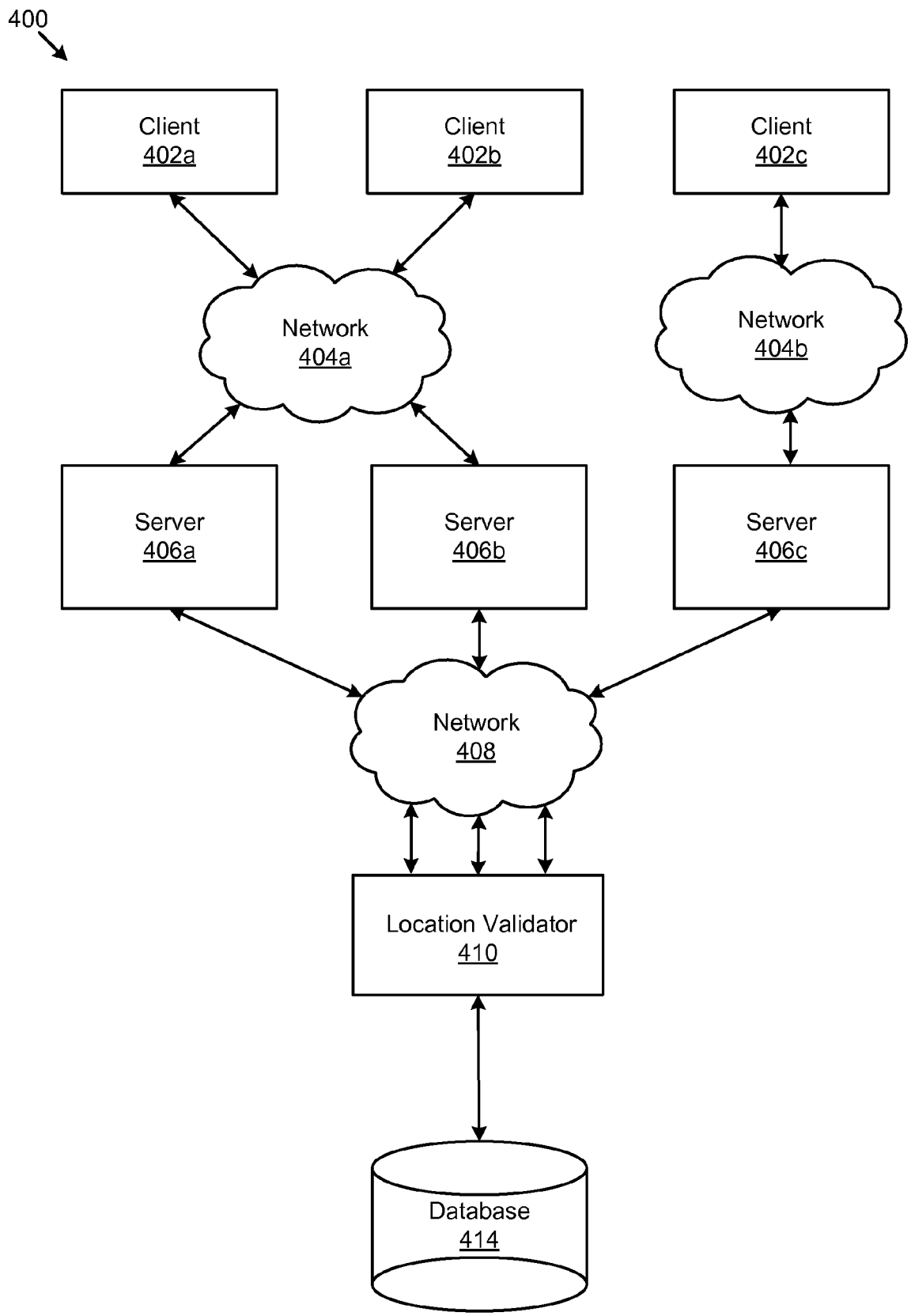
FIG. 4 is a schematic block diagram illustrating an alternative embodiment of a system for user authentication based on authentication credentials and location information.

FIG. 4 illustrates an alternative embodiment of a system 400 for user authentication based on authentication credentials and location information. In the illustrated embodiment, multiple clients 402, multiple networks 404, a database 414, and the network 408 operate in substantially like manner as components having similar names in the system 100 described with relation to FIG. 1.

In one embodiment, the location validator 410 performs a location validation service for multiple clients 402 and/or multiple server 406 systems. In one embodiment, a server 406*a* receives a user authentication request from client 402*b*. The server 406*a* submits a location validation request with current user location information to the location validator 410 which operates in a similar manner as the apparatus 200 described with relation to FIG. 2. Namely, the location validator 410 may reference the current user location information obtained from the server 406*a* and reference past user location information which, in one embodiment, is also obtained from the server 406*a* as part of the location validation request. The past user location information may also be obtained from a database 414. The location validator 410 may also include a translator to convert the location identifier portion of the location information obtained from various servers 406 to a common format as described above.

If the location validator 410 determines that the current physical user location is outside the maximum allowable distance, the location validator 410 may signal the server 406*a* to deny the location validation request. Consequently, the server 406*a* will deny the authentication attempt of the client 402*b*. For example, multiple e-commerce websites or authentication services may utilize the services of a common location validator 410, sending current user location information to the location validator 410, thereby allowing the past user location information to be stored and updated regularly and reducing the possibility of identity theft.

Figure 5:
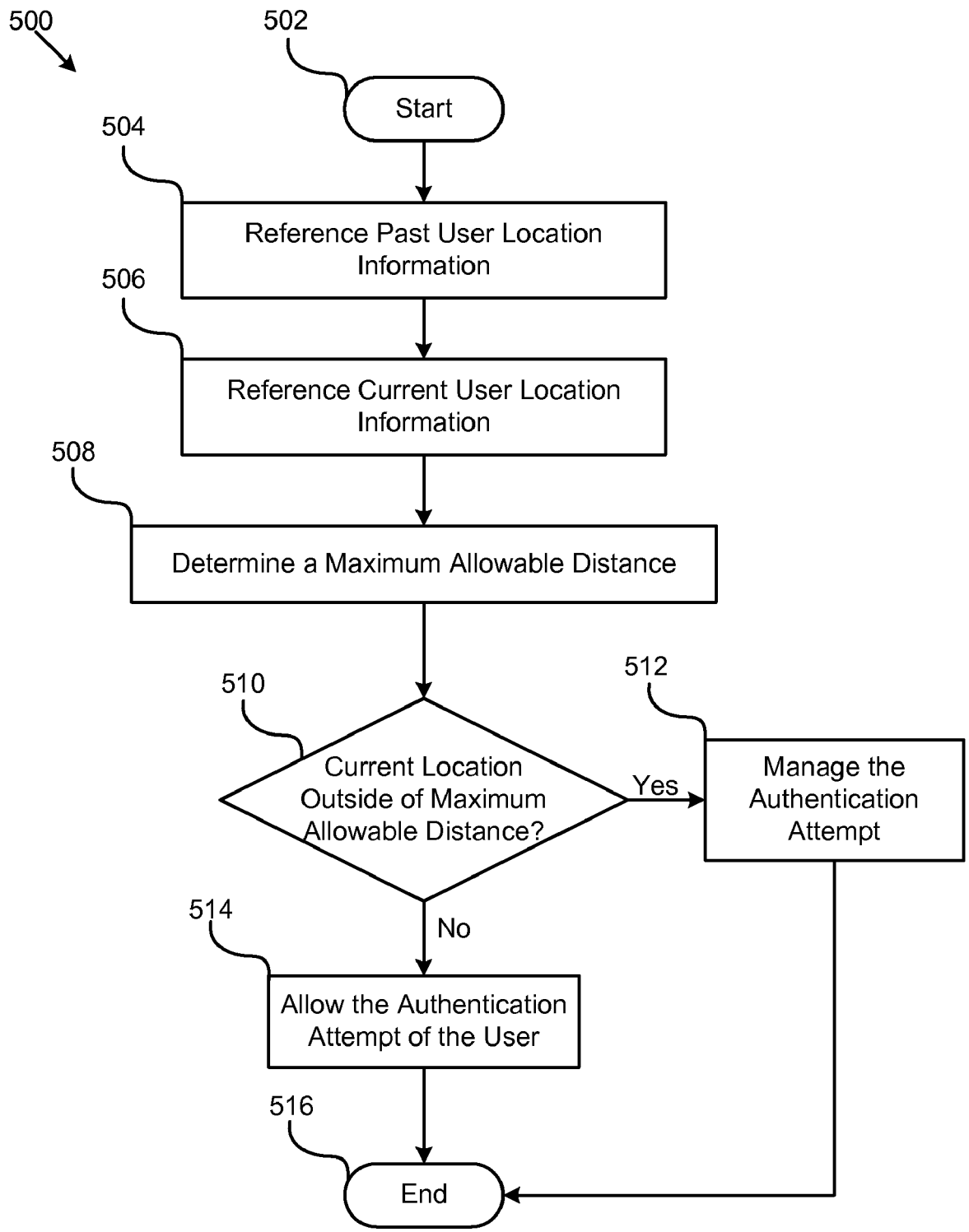
FIG. 5 is a schematic flow chart diagram illustrating one embodiment of a method for user authentication based on authentication credentials and location information.

FIG. 5 illustrates one embodiment of a method 500 for user authentication based on authentication credentials and location information. The method 500 may be implemented by the invoked operations of a computer program product comprising a computer readable medium having computer executable program code. The method 500 starts 502 when the communication module 202 references 504 past user location information from a database 110, in response to receiving an authentication validation request. The communication module 202 then references 506 current user location information from the client 102, converting the user location information to a common format, if necessary, to allow for use with multiple clients 102 that provide multiple location formats. The determination module 204 determines 508 a maximum allowable distance. In one embodiment, if the determination module 204 determines 510 that the physical authentication attempt location is outside the maximum allowable distance, the validation module 206 manages 512 the authentication attempt and may reference the list of user-configurable actions in determining whether to deny the authentication attempt, prompt for more identification, alert law enforcement, or other configurable action and the method ends 516. Alternatively, determination module 204 may determine 510 that the physical authentication attempt location is not outside the maximum allowable distance, the validation module 206 allows 514 the authentication attempt of the user, and the method ends 516.

For example, the communication module 202 may reference 504 past user location information which indicates that a user was at a certain physical location in Washington D.C. at 6:00 PM. The communication module 202 may then reference 506 current user location information which indicates that the user is attempting authentication two miles away at an ATM at 6:30 PM. The determination module 204 may then determine 508 a maximum allowable distance that the user could have traveled in a half hour. The maximum allowable distance for travel by vehicle may be fifteen miles based on a thirty mile per hour velocity. The determination module 204 may then determine 510 that the authentication attempt location of the ATM is not outside the maximum allowable distance, and hence, that the user could have traveled to the new location, and the validation module 206 allows 514 the authentication attempt of the user.

Figure 6:
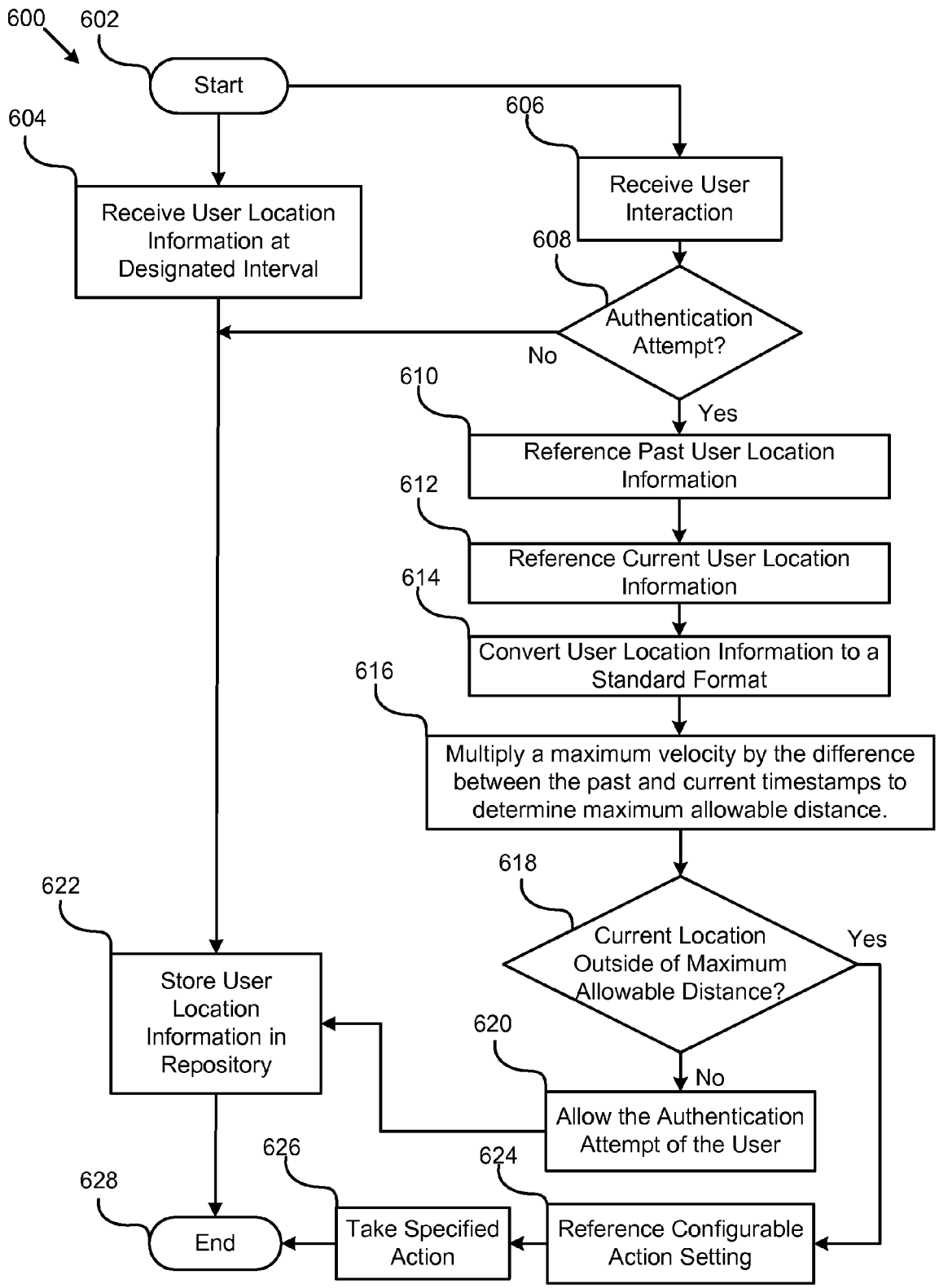
FIG. 6 is a detailed schematic flow chart diagram illustrating one embodiment of a method for user authentication based on authentication credentials and location information.

FIG. 6 illustrates a detailed embodiment of a method 600 for user authentication based on authentication credentials and location information. The method may be implemented by the invoked operations of a computer program product comprising a computer readable medium having computer usable program code.

In one embodiment, the method 600 starts 602 and the tracking module 308 may receive 604 user location information from a client 102 at a designated interval. The tracking module 308 may then store 622 the user location information in a repository such as a database 110 and the method ends 628. In another embodiment, the method 600 starts 602 when the communication module 202 receives 606 a user interaction from a client 102. In one embodiment, the communication module 202 determines 608 that the user interaction is not an authentication attempt, the storage module 306 then stores 622 the user location information in a repository such as a database 110 and the method ends 628.

Alternatively, the communication module 202 may determine 608 that the user interaction is an authentication attempt. The communication module 202 may then reference 610 past user location information from the storage module 306. Next, the communication module 202 may reference 612 current user location information from the client 102. The translation module 302 converts 614 the past and current user location information to a standard format for comparison. The calculation module 304 may then multiply 616 a maximum velocity by the difference between the past and current timestamps to determine maximum allowable distance. In one embodiment, if the determination module 204 determines 618 that the current physical user location is outside the maximum allowable distance, the validation module 206 references 624 a set of user-configurable actions to take. The validation module 206 may then take 626 the specified action which has been set beforehand by a user or authentication service. These actions may include denying the authentication attempt, allowing the authentication attempt anyway, alerting law enforcement authorities, alerting the user, or prompting a user for more information. Then, the method ends 628. Alternatively, the determination module 204 may determine 618 that the physical authentication attempt location is not outside the maximum allowable distance and allow 620 the authentication attempt of the user. The communication module 202 may store 622 the user location information in a repository on the database 110 and the method ends 628.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage device having computer usable program code executable to perform operations for authenticating a user based on authentication credentials and location information, the operations of the computer program product comprising:

referencing past user location information in response to an authentication attempt, the past user location information comprising a past user interaction timestamp and a past user interaction location identifier;

referencing current user location information, the current user location information comprising an authentication attempt timestamp and an authentication attempt location identifier;

determining a maximum distance that the user could have traveled from a past physical location associated with the past user interaction location identifier, based upon the past user interaction timestamp and the authentication attempt timestamp; and permitting the authentication attempt in response to determining that a physical authentication attempt location associated with the authentication attempt location identifier is within the maximum distance that the user could have traveled from the past physical location.

2. The computer readable storage device of claim 1 further comprising denying the authentication attempt in response to determining that the physical authentication attempt location associated with the authentication attempt location identifier is outside the maximum distance that the user could have traveled from the past physical location.

3. The computer readable storage device of claim 1 further comprising prompting the user for additional information in response to determining that the physical authentication attempt location associated with the authentication attempt location identifier is outside the maximum distance that the user could have traveled from the past physical location.

4. The computer readable storage device of claim 1 further comprising managing the authentication attempt, in response to determining that the physical authentication attempt location associated with the authentication attempt location identifier is outside the maximum distance that the user could have traveled from the past physical location, by performing an action predetermined by the user.

5. The computer readable storage device of claim 1, wherein determining the maximum distance that the user could have traveled from the past physical location further comprises multiplying a maximum velocity by the difference between the past user interaction timestamp and the authentication attempt timestamp.

6. The computer readable storage device of claim 1, further comprising determining that the distance between a current physical user location associated with user location information obtained from a personal device is outside the maximum distance that the user could have traveled from the physical authentication attempt location obtained from an authentication attempt and denying the authentication attempt.

7. A computer readable storage device having computer usable program code executable to perform operations for a third-party validation service based on user location information, the operations of the computer program product comprising:

tracking user location information based on a user interaction;

receiving a location validation request with current user location information;

the current user location information comprising an authentication attempt timestamp and an authentication attempt location identifier;

referencing past user location information, the past user location information comprising a past user interaction timestamp and a past user interaction location identifier;

determining a maximum distance that the user could have traveled from a past physical location associated with the past user interaction location identifier, based upon the past user interaction timestamp and the authentication attempt timestamp;

denying the location validation request, in response to determining that a physical authentication attempt location associated with the authentication attempt location identifier is outside the maximum distance; and permitting the location validation request, in response to determining that the physical authentication attempt location associated with the authentication attempt location identifier is within the maximum distance that the user could have traveled from the past physical location.

8. The computer readable storage device of claim 1 further comprising storing the current user location information as the past user location information in response to permitting the authentication attempt.

9. The computer readable storage device of claim 3 further comprising permitting the authentication attempt in response to valid information supplied by the user in response to the prompt for additional information.

10. The computer readable storage device of claim 1, wherein determining the maximum distance that the user could have traveled from the past physical location is further based upon a speed of travel.

11. The computer readable storage device of claim 10, wherein the speed of travel involves travel in a straight line between the past user location and the current user location.

12. The computer readable storage device of claim 10, wherein the speed of travel is further based on selecting a speed associated with selected mode of transportation.

13. The computer readable storage device of claim 1, wherein:
determining the maximum distance that the user could have traveled from a past physical location associated with the past user interaction location identifier further comprises selecting a travel route between the physical authentication attempt location and the past physical location.

14. A method for authenticating a user based on authentication credentials and location information, the method comprising:

referencing past user location information in response to an authentication attempt, the past user location information comprising a past user interaction timestamp and a past user interaction location identifier;

referencing current user location information, the current user location information comprising an authentication attempt timestamp and an authentication attempt location identifier;

determining, by a processor, a maximum distance that the user could have traveled from a past physical location associated with the past user interaction location identifier, based upon the past user interaction timestamp and the authentication attempt timestamp; and permitting the authentication attempt in response to determining that a physical authentication attempt location associated with the authentication attempt location identifier is within the maximum distance that the user could have traveled from the past physical location.

15. The method of claim 14 further comprising denying the authentication attempt in response to determining that the physical authentication attempt location associated with the authentication attempt location identifier is outside the maximum distance that the user could have traveled from the past physical location.

16. The method of claim 14 further comprising prompting the user for additional information in response to determining that the physical authentication attempt location associated with the authentication attempt location identifier is outside the maximum distance that the user could have traveled from the past physical location.

17. The method of claim 16 further comprising permitting the authentication attempt in response to valid information supplied by the user in response to the prompt for additional information.

18. The method of claim 14 further comprising managing the authentication attempt, in response to determining that the physical authentication attempt location associated with the authentication attempt location identifier is outside the maximum distance that the user could have traveled from the past physical location, by performing an action predetermined by the user.

19. The method of claim 14, wherein determining the maximum distance that the user could have traveled from the past physical location further comprises multiplying a maximum velocity by the difference between the past user interaction timestamp and the authentication attempt timestamp.

20. The method of claim 19, wherein the maximum velocity is based on a selected travel route between the physical authentication attempt location and the past physical location.

21. The method of claim 14, further comprising determining that the distance between a current physical user location associated with user location information obtained from a personal device is outside the maximum distance that the user could have traveled from the physical authentication attempt location obtained from an authentication attempt and denying the authentication attempt.

22. The method of claim 14 further comprising storing the current user location information as the past user location information in response to permitting the authentication attempt.

23. The method of claim 14, wherein determining the maximum distance is further based upon a maximum speed.

24. The method of claim 23, wherein the maximum speed is based on the past user location information and the current user location information.

25. The method of claim 23, wherein the maximum speed is further based on selecting a speed associated with a particular mode of transportation.

* * * * *